(12) United States Patent
Ghetti et al.

(10) Patent No.: US 11,232,216 B1
(45) Date of Patent: *Jan. 25, 2022

(54) SYSTEMS AND METHODS FOR GENERATION OF SECURE INDEXES FOR CRYPTOGRAPHICALLY-SECURE QUERIES

(71) Applicant: IONIC SECURITY, INC., Atlanta, GA (US)

(72) Inventors: Adam Ghetti, Atlanta, GA (US); Ryan Mark Speers, Silver Spring, MD (US); Jonathan Thomas Burns, Annapolis, MD (US); Jeffrey Howard, Annapolis, MD (US)

(73) Assignee: Ionic Security Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/930,502

(22) Filed: Jul. 16, 2020

Related U.S. Application Data

(63) Continuation of application No. 15/973,047, filed on May 7, 2018, now Pat. No. 10,740,474, which is a
(Continued)

(51) Int. Cl.
*G06F 21/60* (2013.01)
*H04L 9/32* (2006.01)
(Continued)

(52) U.S. Cl.
CPC ........ *G06F 21/602* (2013.01); *G06F 16/2255* (2019.01); *G06F 16/2282* (2019.01);
(Continued)

(58) Field of Classification Search
CPC .. G06F 21/602; G06F 16/2255; G06F 16/245; G06F 16/2282; H04L 9/3242; H04L 9/321

See application file for complete search history.

(56) References Cited

U.S. PATENT DOCUMENTS

| 5,915,025 A | 6/1999 | Taguchi et al. |
| 5,963,646 A | 10/1999 | Fielder et al. |

(Continued)

FOREIGN PATENT DOCUMENTS

| EP | 2901359 A1 | 8/2015 |
| WO | 2012103093 A1 | 8/2012 |

OTHER PUBLICATIONS

Bellare, Introduction to Modern Cryptography, pp. 93-137, May 11, 2005.*

(Continued)

*Primary Examiner* — Albert M Phillips, III
(74) *Attorney, Agent, or Firm* — Morris, Manning & Martin, LLP; Daniel E. Sineway, Esq.; Adam J. Thompson, Esq.

(57) ABSTRACT

Systems and methods are disclosed for generation of secure indexes that permit the querying or searching of encrypted data in a cryptographically-secure manner. In various embodiments, a filter gradient comprises a node identifier, a set membership filter, and an ordered genealogy (such that it comprises a filter that encodes a subset of the items encoded by its parent), and a FiG tree is a rooted tree with filter gradients (and, optionally, one or more dictionaries) as nodes such that each filter gradient uses a different hash. A HiiT data structure, in various embodiments, comprises a hash table that points to the rows of an inverted index table. In various embodiments, an oblivious pseudorandom function may be employed to mask, secure, and prepare the phrases for insertion into the secure indexes.

19 Claims, 7 Drawing Sheets

Related U.S. Application Data continuation-in-part of application No. 15/392,561, filed on Dec. 28, 2016, now Pat. No. 10,503,730.

(60) Provisional application No. 62/502,732, filed on May 7, 2017, provisional application No. 62/271,830, filed on Dec. 28, 2015.

(51) Int. Cl.
  *G06F 16/22* (2019.01)
  *G06F 16/245* (2019.01)

(52) U.S. Cl.
  CPC ............ *G06F 16/245* (2019.01); *H04L 9/321* (2013.01); *H04L 9/3242* (2013.01)

(56) References Cited

U.S. PATENT DOCUMENTS

| | | | |
|---|---|---|---|
| 6,026,165 A | 2/2000 | Marino et al. | |
| 6,565,609 B1 | 5/2003 | Sorge et al. | |
| 6,904,521 B1 | 6/2005 | Jivsov | |
| 7,548,908 B2 | 6/2009 | Fu et al. | |
| 7,558,970 B2 | 7/2009 | Bellovin et al. | |
| 7,620,781 B2 | 11/2009 | Breternitz, Jr. et al. | |
| 7,636,439 B2 | 12/2009 | Nakabayashi et al. | |
| 7,930,547 B2 | 4/2011 | Hao et al. | |
| 7,937,428 B2 | 5/2011 | Beyer et al. | |
| 8,032,529 B2 | 10/2011 | Gupta et al. | |
| 8,209,368 B2 | 6/2012 | Beyer et al. | |
| 8,261,069 B2 | 9/2012 | Bellovin et al. | |
| 8,291,509 B2 | 10/2012 | Kerschbaum et al. | |
| 8,296,274 B2 | 10/2012 | Leppard et al. | |
| 8,396,873 B2 | 3/2013 | Xie | |
| 8,495,709 B1 | 7/2013 | Cooper et al. | |
| 8,510,571 B1 | 8/2013 | Chang et al. | |
| 8,526,603 B2 | 9/2013 | Kerschbaum | |
| 8,533,489 B2 | 9/2013 | Roeder et al. | |
| 8,572,385 B2 | 10/2013 | Papamanthou et al. | |
| 8,584,232 B2 | 11/2013 | Kerschbaum | |
| 8,621,036 B1 | 12/2013 | L'Heureux et al. | |
| 8,706,884 B2 | 4/2014 | Ruellan et al. | |
| 8,726,034 B2 | 5/2014 | Papamanthou et al. | |
| 8,756,238 B2 | 6/2014 | Xie | |
| 8,811,620 B2 | 8/2014 | Chaves et al. | |
| 8,832,427 B2 | 9/2014 | Roeder et al. | |
| 8,904,176 B2 | 12/2014 | Karp et al. | |
| 8,930,691 B2 | 1/2015 | Kamara et al. | |
| 8,978,155 B2 | 3/2015 | Tamassia et al. | |
| 9,037,860 B1 | 5/2015 | Kerschbaum et al. | |
| 9,058,495 B2 | 6/2015 | Brannon et al. | |
| 9,064,229 B2 | 6/2015 | Chaves et al. | |
| 9,098,725 B2 | 8/2015 | Papamanthou et al. | |
| 9,143,449 B2 | 9/2015 | Valenza et al. | |
| 9,152,716 B1 | 10/2015 | Triandopoulos et al. | |
| 9,171,153 B2 | 10/2015 | Jorgensen | |
| 9,201,949 B2 | 12/2015 | Xie | |
| 9,213,764 B2 | 12/2015 | Kerschbaum et al. | |
| 9,224,000 B1 | 12/2015 | Ghetti | |
| 9,367,574 B2 | 6/2016 | Gupta | |
| 9,384,126 B1 | 7/2016 | Sprouse et al. | |
| 2002/0031225 A1 | 3/2002 | Hines | |
| 2002/0147917 A1* | 10/2002 | Brickell .............. | G06F 21/6245 713/193 |
| 2004/0073617 A1 | 4/2004 | Milliken et al. | |
| 2004/0098348 A1 | 5/2004 | Kawasaki et al. | |
| 2004/0101141 A1 | 5/2004 | Alve | |
| 2004/0151323 A1 | 8/2004 | Olkin et al. | |
| 2005/0071280 A1 | 3/2005 | Irwin et al. | |
| 2006/0010324 A1 | 1/2006 | Appenzeller et al. | |
| 2007/0174613 A1 | 7/2007 | Paddon et al. | |
| 2007/0219915 A1 | 9/2007 | Hatano et al. | |
| 2007/0271459 A1 | 11/2007 | Gomez | |
| 2008/0046718 A1 | 2/2008 | Grab et al. | |
| 2008/0077806 A1 | 3/2008 | Cui et al. | |
| 2008/0130902 A1 | 6/2008 | Foo Kune et al. | |
| 2009/0296926 A1 | 12/2009 | Perlman | |
| 2009/0300168 A1 | 12/2009 | Guo et al. | |
| 2009/0319799 A1 | 12/2009 | Carpenter et al. | |
| 2010/0042838 A1 | 2/2010 | Ho | |
| 2010/0095127 A1 | 4/2010 | Banerjee et al. | |
| 2010/0106980 A1 | 4/2010 | Kerschbaum et al. | |
| 2010/0005509 A1 | 6/2010 | Peckover | |
| 2011/0093210 A1 | 4/2011 | Matsuzaki et al. | |
| 2011/0113050 A1* | 5/2011 | Youn .................. | G06F 21/6218 707/757 |
| 2011/0145571 A1 | 6/2011 | Schmidt-Karaca et al. | |
| 2012/0185612 A1 | 7/2012 | Zhang et al. | |
| 2012/0300923 A1 | 11/2012 | Arakawa et al. | |
| 2013/0024688 A1 | 1/2013 | Wen et al. | |
| 2013/0042108 A1 | 2/2013 | Cancedda | |
| 2013/0097421 A1 | 4/2013 | Lim | |
| 2013/0298202 A1 | 11/2013 | Warshavsky et al. | |
| 2014/0025786 A1 | 1/2014 | Gage | |
| 2014/0215590 A1 | 7/2014 | Brand | |
| 2014/0337930 A1 | 11/2014 | Hoyos et al. | |
| 2015/0039885 A1 | 2/2015 | Cash et al. | |
| 2015/0039903 A1 | 2/2015 | Cash et al. | |
| 2015/0101012 A1 | 4/2015 | White et al. | |
| 2015/0156011 A1 | 6/2015 | Kamara et al. | |
| 2015/0163309 A1 | 6/2015 | Arnoud et al. | |
| 2015/0200958 A1 | 7/2015 | Muppidi et al. | |
| 2016/0140179 A1 | 5/2016 | Yuen | |

OTHER PUBLICATIONS

Zittrower et al., "Encrypted Phrase Searching in the Cloud," Globecom 2012; pp. 764-770.

Weaver, et al., "Satisfiability-based Set Membership Filters," Journal on Satisfiability, Boolean Modeling and Computation 8 (2014); pp. 129-148.

Constantino, et al., "Towards Enforcing On-The-Fly Policies in BYOD Environments", Information Assurance and Security (IAS), 2013 9th International Conference, IEEE, 2013.

Cash, et al., Dynamic Searchable Encryption in very-large Databases: Data Structures and Implementation, Proceedings of the 21st Network and Distributed System Security Syposium, NDSS, 2014.

Cash, et al., Highly-Scalable Searchable Symmetric Encryption with Support for Boolean Queries, Proceedings of the 33rd Cryptology Conference, CRYPTO, 2013.

Chaum, Bind Signatures for Untraceable Payments, Advances in Cryptology Proceedings of Crypto, 1983.

Goh, Secure Indexes, Technical Report 216, IACR Cryptology ePrint Archive, 2003.

Hahn, et al., Searchable Encryption with Secure and Efficient Updates, Proceedings of the 2014 ACM SIGSAC Conference on Computer and Communications Security, ACM, 2014.

Icart, et al., How to Hash into Elliptic Curves, 5677 Lecture Notes in Computer Science (Advances in Cryptology—CRYPTO 2009) 303, 2009.

Kamara, et al., Dynamic Searchable Symmetric Encryption, Proceedings of the 19th ACM Conference on Computer and Communications Security, CCS, 2012.

Kamara, Parallel and Dynamic Searchable Symmetric Encryption, Proceedings of the 17th International Conference on Financial Cryptography and Data Security, FC, 2013.

Naveed, et al., Dynamic Searchable Encryption via Blind Storage, Proceedings of the 35th IEEE Symposium on Security and Privacy, S&P, 2014.

Afton Geil, Quotient Filters: Approximate Membership Queries on the GPU, University of California, GTC 2016.

Bin Fan, et al., Cuckoo Filter: Practically Better Than Bloom, Dec. 2014.

Bonomi, Beyond Bloom Filters: Form Approximate Membership Checks to Approximate State Machines, SIGCOMM, 2006.

Guanrong Chen, Approximate Kalman Filtering, Series in Approximations and Decompositions—vol. 2, World Scientific, Singapore, 1993.

Lovett, et al., A Lower Bound for Dynamic Approximate Membership Data Structures, Electronic Colloquium on Computational Complexity, Report No. 87, May 17, 2010.

(56) References Cited

OTHER PUBLICATIONS

Pandey, A General-Purpose Counting Filer: Making every Bit Count, 2017.
Szabo-Wexler, Approximate Membership of Sets: A Survey, Carnegie Mellon University, 2016.
Vahideh Akhlaghi, et al., Resistive Bloom Filters From Approximate Membership to Approximate Computing with Bounded Errors, 2016.
Stanislaw Jarecki, et al., "Round-Optimal Password-Protected Secret Sharing and T-PAKE in the Password-Only model", pp. 1-44.
Pierre Baldi, et al., "Countering GATTACA: Efficient and Secure Testing of Fully-Sequenced Human Genomes", CCS'11, Oct. 17-21, 2011, pp. 691-702.

* cited by examiner

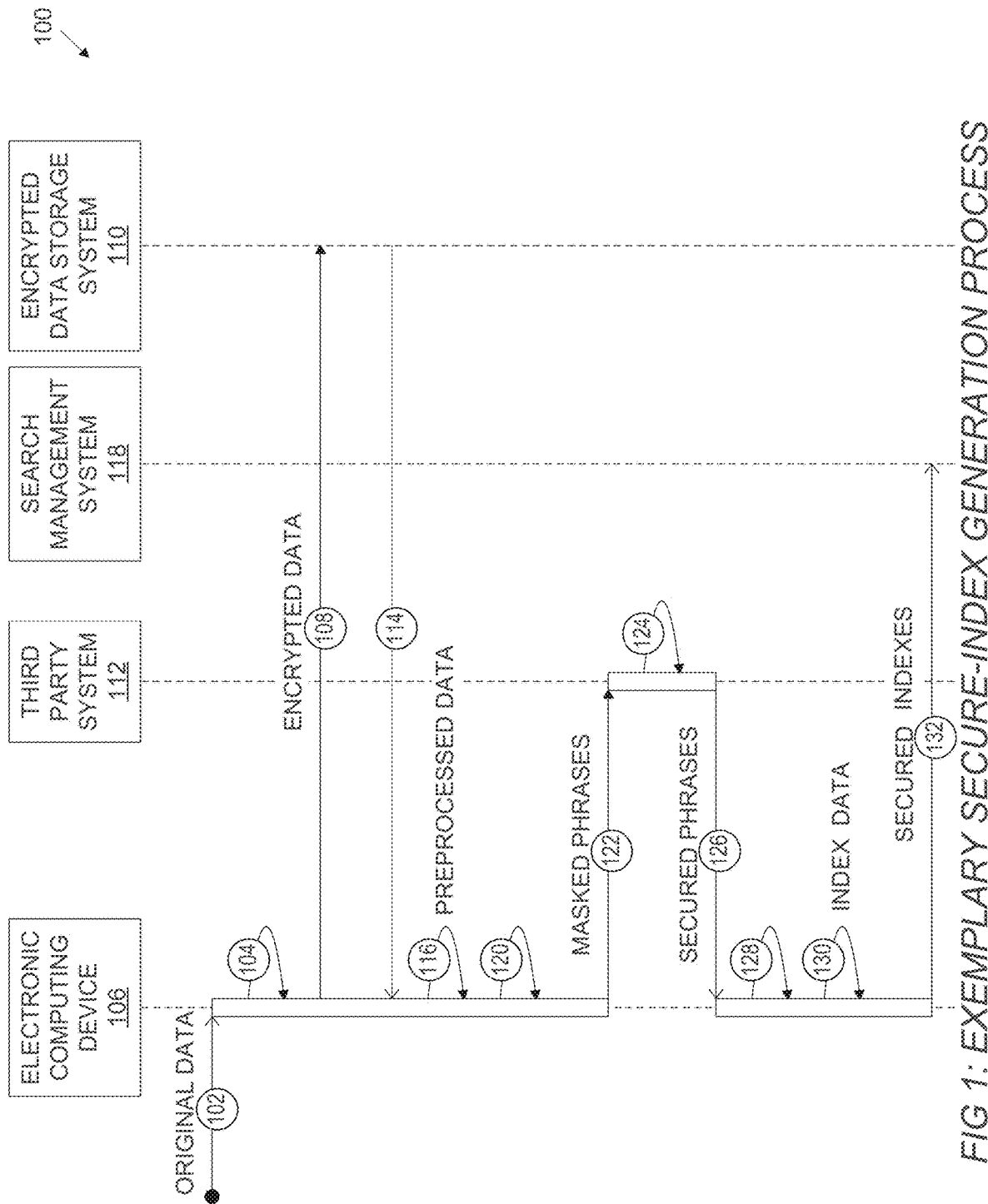
FIG 1: EXEMPLARY SECURE-INDEX GENERATION PROCESS

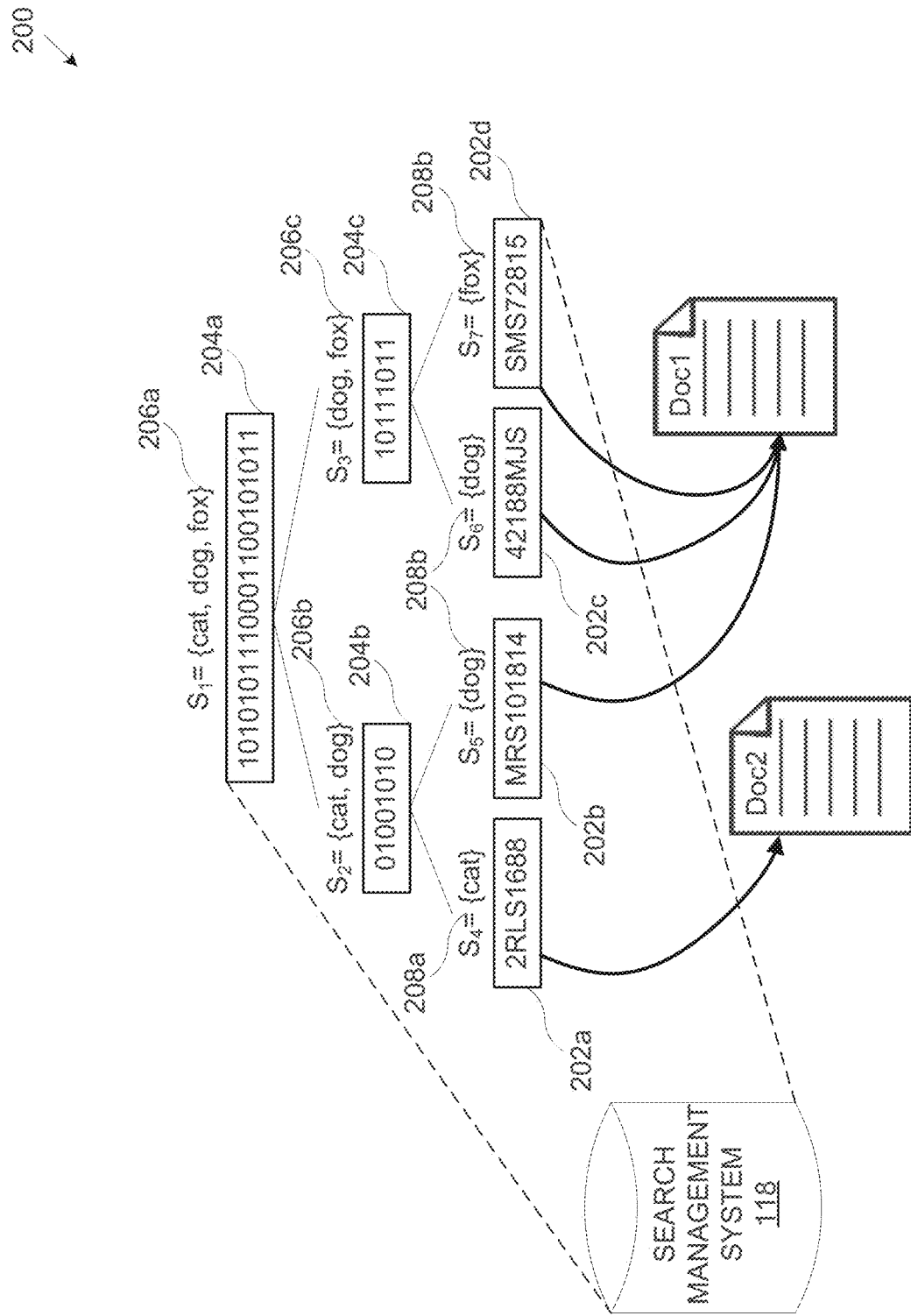
FIG. 2: EXEMPLARY FILTER-GRADIENT TREE

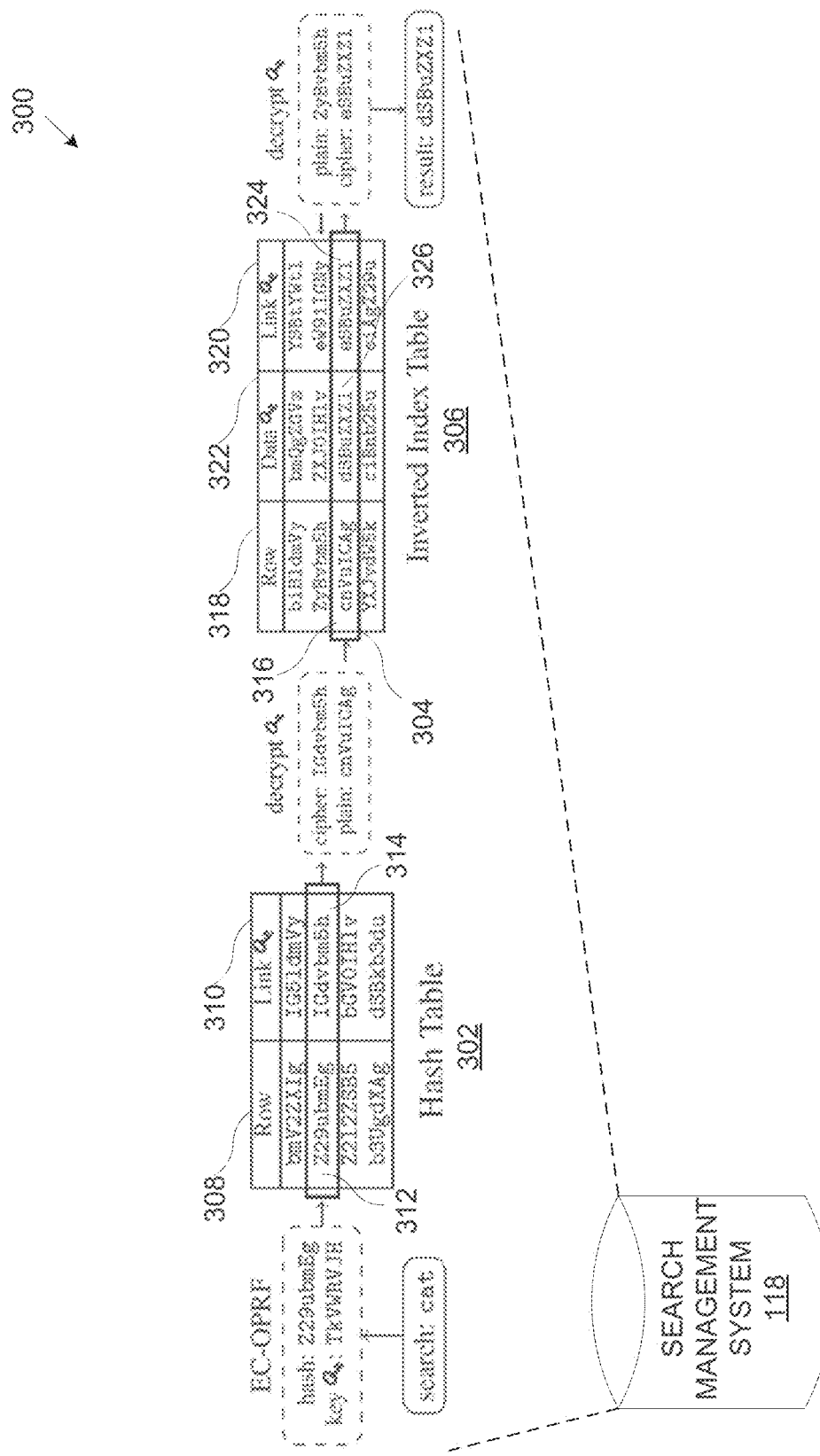
FIG. 3: EXEMPLARY HASH AND INVERTED INDEX TABLE

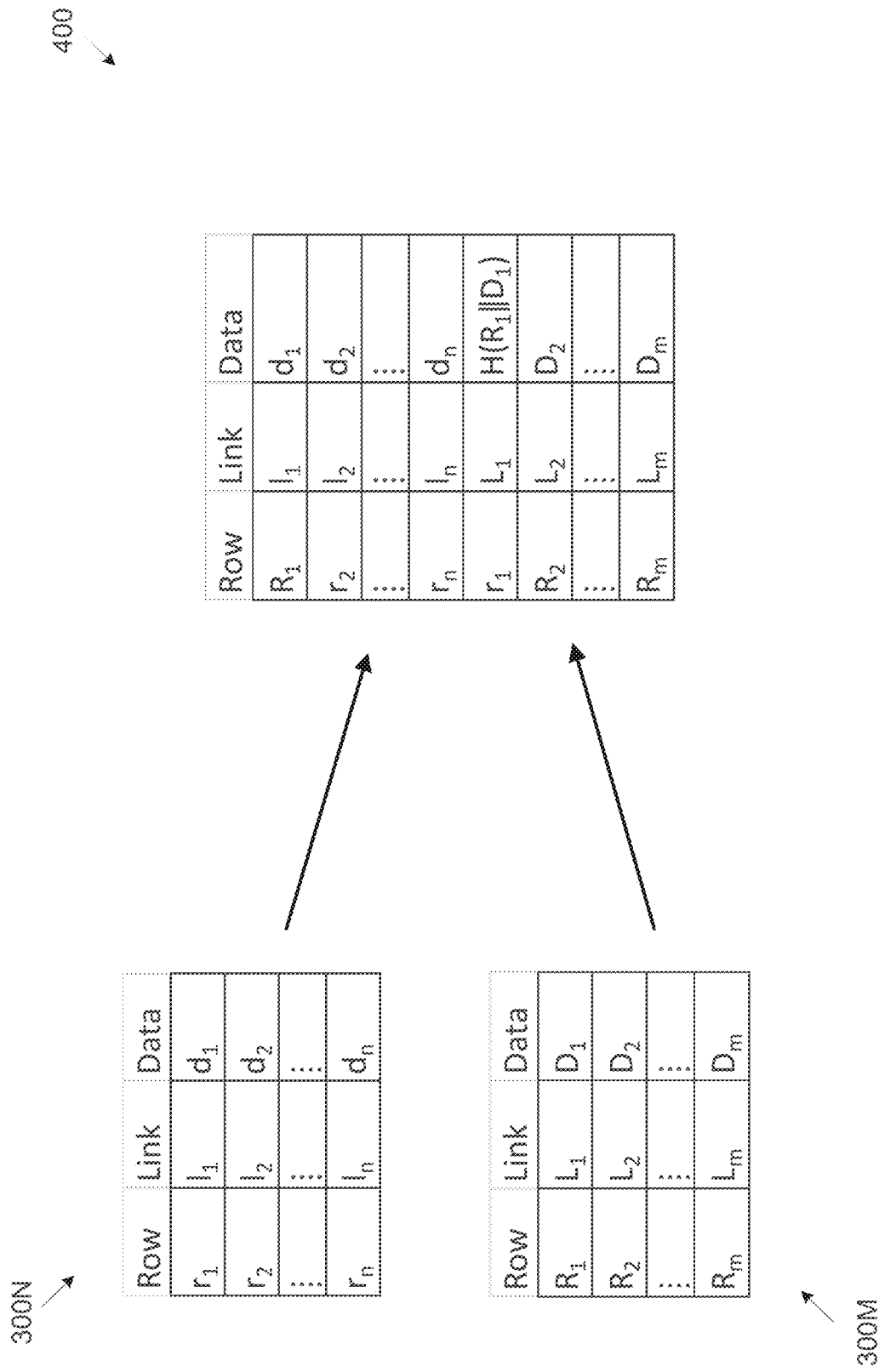
FIG. 4: EXEMPLARY MERGED HASH AND INVERTED INDEX TABLE

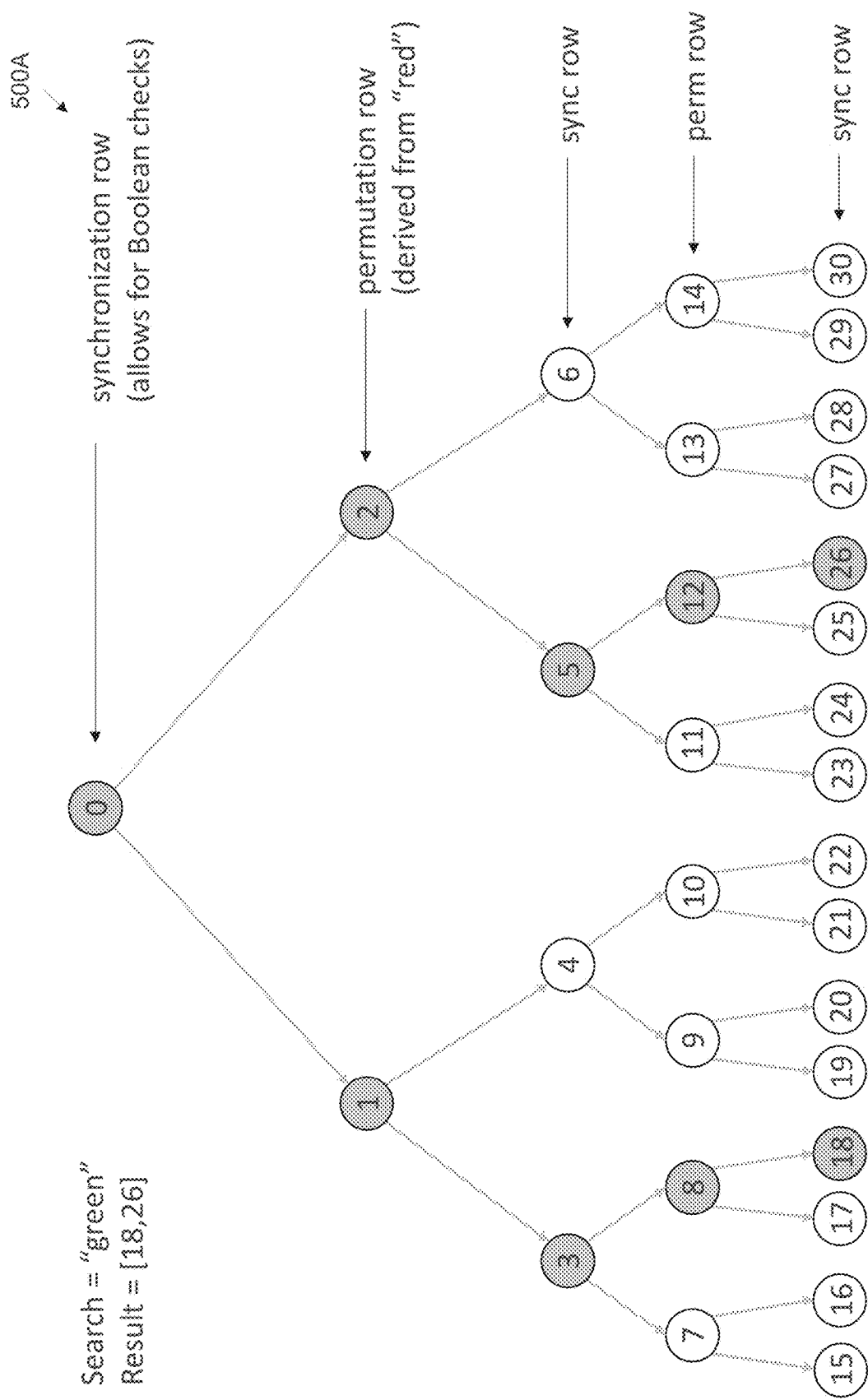
FIG 5A: EXEMPLARY ALTERNATIVE FILTER GRADIENT TREE

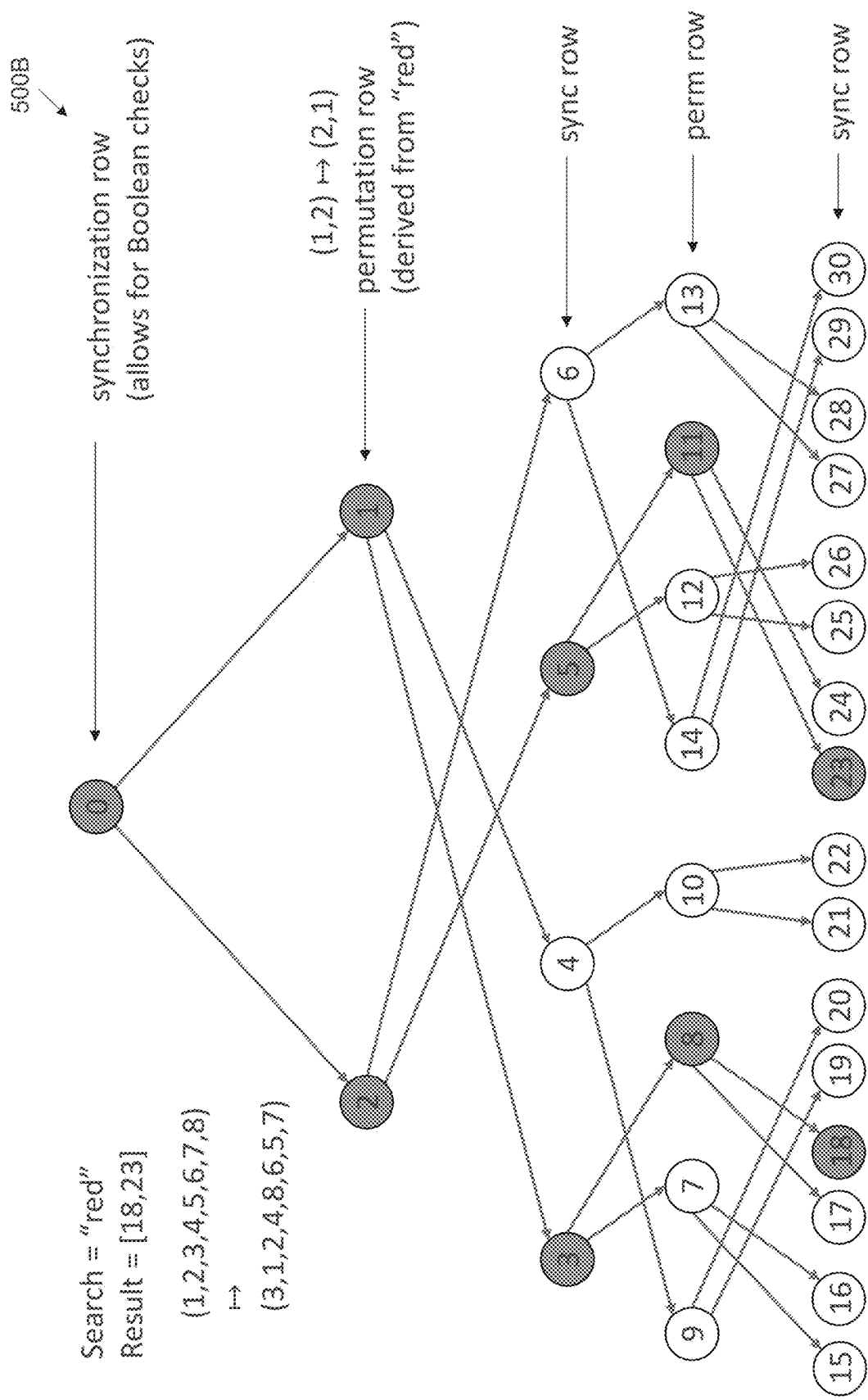
FIG 5B: EXEMPLARY ALTERNATIVE FILTER GRADIENT TREE

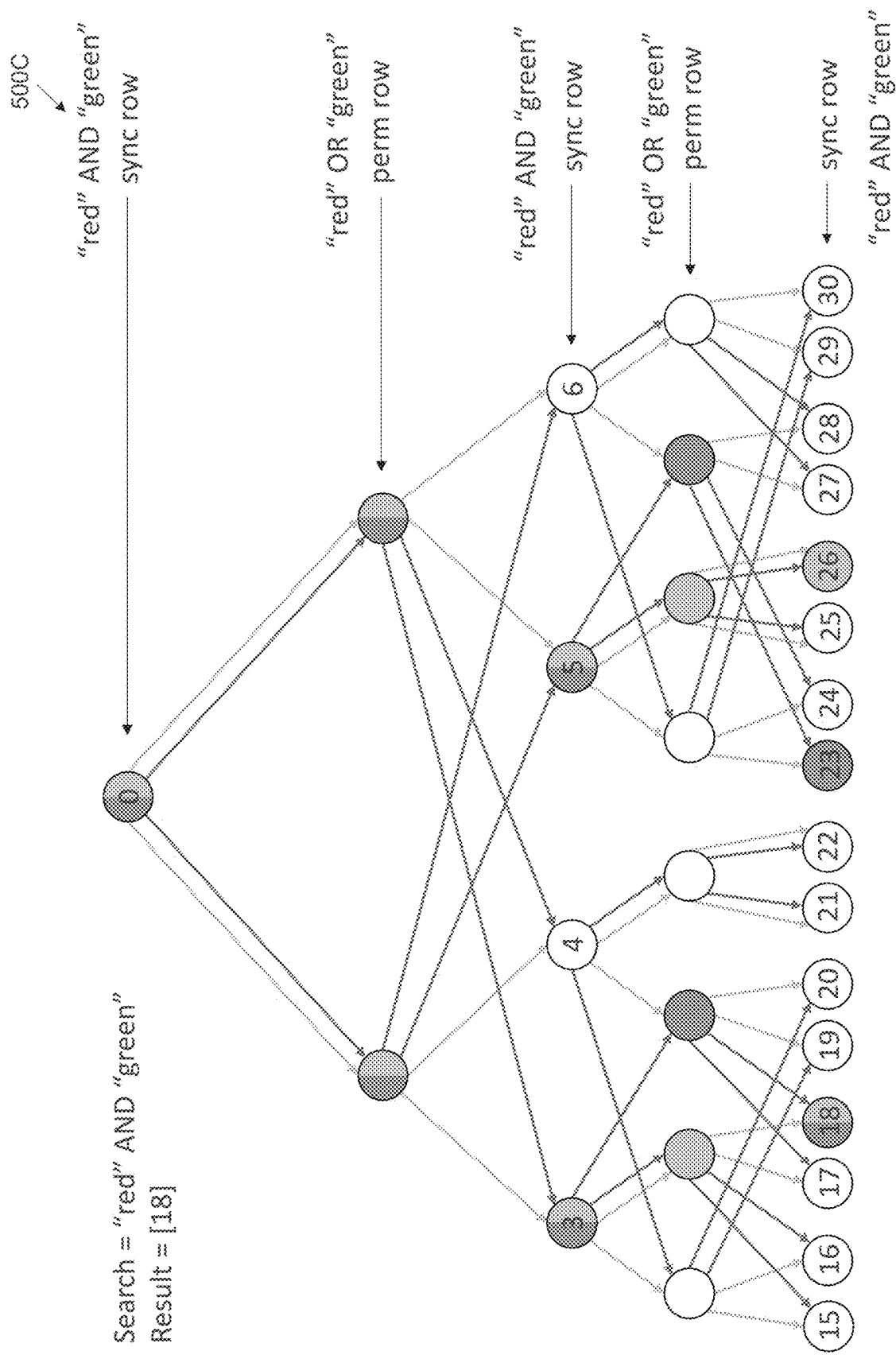
FIG 5C: EXEMPLARY ALTERNATIVE FILTER GRADIENT TREE

SYSTEMS AND METHODS FOR GENERATION OF SECURE INDEXES FOR CRYPTOGRAPHICALLY-SECURE QUERIES

CROSS REFERENCE TO RELATED APPLICATIONS

This application is a continuation of U.S. patent application Ser. No. 15/973,047, filed on May 7, 2018, and entitled "SYSTEMS AND METHODS FOR GENERATION OF SECURE INDEXES FOR CRYPTOGRAPHICALLY-SECURE QUERIES," which:

claims priority to, the benefit under 35 U.S.C. § 119 of, and incorporates by reference herein in its entirety U.S. Provisional Patent Application No. 62/502,732, filed May 7, 2017, and entitled "Systems and Methods for Generation of Secure Indexes for Cryptographically-Secure Queries;" and is a continuation-in-part of U.S. patent application Ser. No. 15/392,561, filed Dec. 28, 2016, and entitled "Systems and Methods for Cryptographically-Secure Queries Using Filters Generated by Multiple Parties," which claims priority to, and the benefit under 35 U.S.C. § 119 of U.S. Provisional Patent Application No. 62/271,830, filed Dec. 28, 2015, and entitled "Systems and Methods for Cryptographically-Secure Queries Using Filters Generated by Multiple Parties," all of which are hereby incorporated by reference in their entireties.

TECHNICAL FIELD

The present systems and methods relate generally to cryptographically secure queries and, more particularly, to generation of secure indexes that permit the querying or searching of encrypted data in a cryptographically-secure manner.

BACKGROUND

With identity theft and data security breach incidents on the rise in today's digital age, data (information) security is a major concern for individuals and organizations. Generally, most conventional data security systems are designed using either an asymmetric key-based infrastructure (alternatively known as a public-private key-based (PPK) infrastructure), or a symmetric key-based infrastructure. To prevent data loss, however, these systems often compromise usability for security. For example, it is very difficult to search encrypted data using unencrypted search terms because traditionally the data must be decrypted before the search can be conducted. This decryption takes time and is computationally draining and inefficient, as each piece of data to be searched must be decrypted. Further, many such searches are not even possible in conventional systems as a given user may not have the appropriate authority to decrypt certain data. Thus, certain data to be searched will either not be surfaced to the user or, worse, may be provided to the user without proper authorization. These difficulties are only exacerbated by encryption-at-rest systems that only decrypt the original data in limited circumstances when proper authorization has been verified, which means that a search of the original data using unencrypted search terms is currently impossible.

Therefore, there is a long-felt but unresolved need for a system or method that permits querying encrypted data in a cryptographically-secure manner through generation of secure indexes.

BRIEF SUMMARY OF THE DISCLOSURE

Briefly described, and according to one embodiment, aspects of the present disclosure generally relate to systems and methods for generation of secure indexes that permit the querying or searching of encrypted data in a cryptographically-secure manner.

Data in certain computing architectures may be difficult if not impossible to search/query against. For example, the data may be in an encrypted/obfuscated format, which limits the efficacy of plaintext searches of the data. In another example, the data may be stored and/or managed in a separate location or system that prevents the use of a traditional search functionality to query the data. According to the present disclosure, in computing architectures where the data is difficult to search/query against, a secure index, such as a filter or a hash and inverted index table ("HiiT") data structure, may be used to represent the data so that a subsequent user, with access to only the filter or HiiT, may determine whether his or her particular search term/query is within that data without querying/searching the data.

Generally, "filters" (also referred to as "set membership filters" and/or "approximate set membership filters") are probabilistic algorithms, data structures, or other mathematical objects that can be used to quickly decide whether a given element is within a given set (e.g., filters solve the set membership problem by efficiently testing whether a large set of data contains a particular item). Thus, filters are created to efficiently represent a large set of data so that a subsequent user can determine, with an acceptable error rate (of false positives, false negatives, and other types of collisions), whether an item is within the original set of data through access to just the filter (further details regarding set membership filters are discussed in Sean A. Weaver et al., Satisfiability-based Set Membership Filters, in 8 Journal on Satisfiability, Boolean Modeling and Computation 129 (2014), the disclosure of which is incorporated by reference herein). To accomplish this space-efficient and time-efficient querying, set membership filters generally comprise representations of each of the data elements within the set of data elements the particular filter was constructed to represent. Examples of filters include, but are not limited to, Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, counting quotient filters, word-size truncated recursion filters, SAT filters, XORSAT filters, Bloomier filters, and other types of set membership filters. In various embodiments, filters may be stored in memory and checked before performing a slower retrieval from storage because memory is generally fast but expensive and limited in space, whereas storage is cheap and unlimited in space but slow.

In one embodiment, one or more "dictionaries" may also be employed in conjunction with filters to provide additional data (e.g., metadata, etc.). Generally, dictionaries are algorithms similar to filters that answers the question "what value does a particular item evaluate to in the set?" or "what is the context of a particular item in the set?" in contrast to a filter answering the question "is this item in the set?" (further details regarding dictionaries are discussed in Ely Porat, *An Optimal Bloom Filter Replacement Based on Matrix Solving*, in arXiv:0804.1845 [cs.DS] (2008), the disclosure of which is incorporated by reference herein). For example, a filter may return a "yes" or "no," that an item is within the set, and one or more dictionaries may be used to determine exactly where in the set the item is located (e.g., that it is the fourth word in the set, etc.), other metadata about the item (e.g., that the item occurs five times in the set, or that it is considered to be an important item in the set based on the context in which it appeared, etc.), or to guide the search algorithm (e.g., instruct the algorithm to jump to a specific subtree instead of continuing with the typical search order, etc.).

A HiiT data structure, in various embodiments, comprises a hash table that points to the rows of an inverted index table (e.g., in one embodiment, the entries of an inverted index table are converted into a set of linked lists with fixed sized nodes, wherein the dimensions of the resulting collection are flattened by storing each node as an encrypted row in a table). Generally, each HiiT hash table comprises "row" columns (also referred to as "buckets" or "values") and "link" columns (also referred to as "keys"), wherein the row column comprises hash digests that are used as row identifiers and the link column comprises encrypted links that point to the row identifiers in the inverted index table. Similarly, in various embodiments, each HiiT inverted index table also comprises "row" columns (also referred to as "buckets" or "values") and "link" columns (also referred to as "keys"), as well as columns for encrypted data (e.g., the indexes of the data represented within the HiiT) and related metadata, wherein the row column comprises randomly generated values that function as unique row identifiers, the link column comprises encrypted links that point to the next row in the HiiT inverted index table or a stop symbol, and the encrypted data and metadata columns comprise data stored in encrypted blocks. A HiiT data structure, in various embodiments, is constructed by repeated insertion of search tokens using an algorithm and is fully dynamic (e.g., permitting insertions, deletions, and modification of the data stored/represented within it). In one embodiment, for additional security benefits, the HiiT hash table and HiiT inverted index table may be combined into a single table. Generally, a HiiT data structure is efficiently searchable and, in certain embodiments, is efficiently deployable.

In various embodiments, an electronic computing device receives data (e.g., through input of the data, selection of the data, creation of data, etc.) for which a filter or HiiT is to be generated so that a subsequent user can securely query the received data. This received data may need to be securely queried for many reasons including, but not limited to, the received data will be encrypted (thereby making a plaintext search of the received data ineffective), the received data will be stored in a location that does not permit querying, etc. Examples of data for which filters or HiiTs may be generated include (but are not limited to) text files, audio files, video files, data files, system files, image files, or any form of digital data comprising emails, electronic documents, online messages, social media posts, web-based forms, etc., or any variant, sub-part, portion, or combination thereof. In one embodiment, this data may represent a document containing sensitive data that will be encrypted.

Generally, to generate filters or HiiTs, in one embodiment, the electronic computing device preprocesses the received data by identifying discrete phrases within the received data, removing redundant phrases, removing commonly-used phrases (e.g., "an"), stemming the phrases, adding noise/padding (to intentionally produce false positives and further obfuscate the identity of the underlying data), semantic processing (e.g., named entity recognition, classification, machine learning algorithms, image recognition/detection, scan-screen-remove personally identifiable information, etc.), etc. The electronic computing device transforms the preprocessed data according to a predefined algorithm to mask the data from a third party system so that the third party system (or any other observer such as a nefarious party or the search management system discussed herein) will have no knowledge of the phrases. In one embodiment, the third party system is a system that is operated separate and distinct from the electronic computing device. The electronic computing device transmits the masked phrases to the third party system, in one embodiment, wherein the third party system transforms the masked phrases using a predefined cryptographic algorithm and a cryptographic key, which is known only to the third party system, to generate a secured version of the masked phrases and transmits that secured version of the masked phrases back to the electronic computing device. Upon receipt of the secured version of the masked phrases, in one embodiment, the electronic computing device extracts the secured version of the masked phrases using a predefined algorithm (e.g., an oblivious pseudorandom function, etc.). The electronic computing device generates the filter or HiiT based on the extracted secured version of the masked phrases for subsequent secure querying of the received data. In various embodiments, the filter may be stored in a linear data structure (e.g., record, array, etc.) or a nonlinear data structure (e.g., filter-gradient ("FiG") tree, inverted index, multidimensional filter, etc.).

In various embodiments, a filter gradient is a triple comprising a node identifier, a set membership filter, and an ordered genealogy (such that filter gradient comprises a filter that encodes a subset of the items encoded by its parent), and a FiG tree is a rooted tree with filter gradients (and, optionally, one or more dictionaries) as nodes such that each filter gradient uses a different hash. Querying of a FiG tree is generally performed through a depth first search (e.g., pre-order transversal, post-order transversal, reverse post-order transversal, etc.) or a breath first search of the individual filter gradients within the FiG tree. FiG trees can be composed of either offline or online filters, depending on the required properties of the FiG tree. Generally, a FiG tree is efficiently searchable and, in certain embodiments, is efficiently deployable. In one embodiment, one or more dictionaries may be used to define/override the ordered genealogy of a FiG tree.

A FiG tree, in various embodiments, may comprise set membership filters with a much higher false positive rate (e.g., greater than 10%, etc.) and still achieve an overall lower false positive rate for the FiG tree itself (e.g., less than 0.0001%, etc.). Generally, it is impractical to use set membership filters with such a high false positive rate in a linear data structure (due to their inaccuracy), whereas the hierarchal FiG tree may, in one embodiment, take up less storage than a linear list of set membership filters with the same overall false positive rate as the FiG tree. If the data follows a natural language distribution, in various embodiments, arranging the set membership filters in the FiG tree, using hypergraph partitioning algorithms, so that the sibling nodes at each depth contain the same number of items can square root the overall storage as compared to the flat linear list of the same set membership filters (with both structures comprising comparable false positive rates). Accordingly, FiG trees represent an improvement in hierarchical filter data structures—representing optimizations in both storage size and false positive rates.

In one embodiment, a data storage and retrieval system for a computer memory, comprising: means for configuring the computer memory according to a first logical table, the first logical table including: a first plurality of logical rows, each of the first plurality of logical rows having a first row identifier to identify each of the first plurality of logical rows, wherein each of the first plurality of logical rows corresponds to a particular record of information in a second logical table; a first logical column intersecting the first plurality of logical rows to define a first plurality of logical cells, wherein each of the first plurality of logical cells comprises the first row identifier to identify each of the first plurality of logical rows; and a second logical column intersecting the first plurality of logical rows to define a second plurality of logical cells, wherein each of the second plurality of logical cells comprises a second row identifier to identify each of a second plurality of logical rows; and means for configuring the computer memory according to the second logical table, the second logical table including: the second plurality of logical rows, each of the second plurality of logical rows having the second row identifier to identify each of the second plurality of logical rows; a third logical column intersecting the second plurality of logical rows to define a third plurality of logical cells, wherein each of the third plurality of logical cells comprises the second row identifier to identify each of the second plurality of logical rows; a fourth logical column intersecting the second plurality of logical rows to define a fourth plurality of logical cells, wherein each of the fourth plurality of logical cells comprises a third row identifier to identify an adjacent row of the second plurality of logical rows; and a fifth logical column intersecting the second plurality of logical rows to define a fifth plurality of logical cells, wherein each of the fifth plurality of logical cells comprises a record of information.

In one embodiment, a method, comprising the steps of: receiving data at an electronic computing device, the data comprising a plurality of phrases; transforming each of the plurality of phrases according to a predetermined algorithm to generate a masked version of each of the plurality of phrases; transmitting the masked version of each of the plurality of phrases to a third party system for securing the masked version of each of the plurality of phrases; receiving, at the electronic computing device, the secured version of the plurality of phrases from the third party system; generating a filter representative of the received data based on the received secured version of the plurality of phrases; and transmitting the filter to a search management system for storage in a particular leaf node of a filter gradient tree, the filter gradient tree comprising: a plurality of root nodes, each of the plurality of root nodes comprising a filter gradient corresponding to at least two additional root nodes or at least two of a plurality of leaf nodes, wherein the filter gradient comprises a root node identifier, a set membership filter, and an ordered genealogy of the at least two additional root nodes or the at least two of a plurality of leaf nodes; and the plurality of leaf nodes, wherein each of the plurality of leaf nodes comprises a filter corresponding to a particular record of information.

In one embodiment, a method, comprising the steps of: receiving data at an electronic computing device, the data comprising a plurality of phrases; transforming each of the plurality of phrases according to a predetermined algorithm to generate a masked version of each of the plurality of phrases; transmitting the masked version of each of the plurality of phrases to a third party system for securing the masked version of each of the plurality of phrases; receiving, at the electronic computing device, the secured version of the plurality of phrases from the third party system; and transmitting the received secured version of the plurality of phrases to a search management system for generation of a filter representative of the received data based on the received secured version of the plurality of phrases and storage of the filter in a particular leaf node of a filter gradient tree, the filter gradient tree comprising: a plurality of root nodes, each of the plurality of root nodes comprising a filter gradient corresponding to at least two additional root nodes or at least two of a plurality of leaf nodes, wherein the filter gradient comprises a root node identifier, a set membership filter, and an ordered genealogy of the at least two additional root nodes or the at least two of a plurality of leaf nodes; and the plurality of leaf nodes, wherein each of the plurality of leaf nodes comprises a filter corresponding to a particular record of information.

In one embodiment, a method, comprising the steps of: receiving data at an electronic computing device, the data comprising a plurality of phrases; transforming each of the plurality of phrases according to a predetermined algorithm to generate a masked version of each of the plurality of phrases; transmitting the masked version of each of the plurality of phrases to a third party system for securing the masked version of each of the plurality of phrases; receiving, at the electronic computing device, the secured version of the plurality of phrases from the third party system; and generating a HiiT representative of the received data based on the received secured version of the plurality of phrases, wherein the HiiT comprises: a first logical table, the first logical table including: a first plurality of logical rows, each of the first plurality of logical rows having a first row identifier to identify each of the first plurality of logical rows, wherein each of the first plurality of logical rows corresponds to a particular received secured version of the plurality of phrases in a second logical table; a first logical column intersecting the first plurality of logical rows to define a first plurality of logical cells, wherein each of the first plurality of logical cells comprises the first row identifier to identify each of the first plurality of logical rows; and a second logical column intersecting the first plurality of logical rows to define a second plurality of logical cells, wherein each of the second plurality of logical cells comprises a second row identifier to identify each of a second plurality of logical rows; and the second logical table including: the second plurality of logical rows, each of the second plurality of logical rows having the second row identifier to identify each of the second plurality of logical rows; a third logical column intersecting the second plurality of logical rows to define a third plurality of logical cells, wherein each of the third plurality of logical cells comprises the second row identifier to identify each of the second plurality of logical rows; a fourth logical column intersecting the second plurality of logical rows to define a fourth plurality of logical cells, wherein each of the fourth plurality of logical cells comprises a third row identifier to identify an adjacent row of the second plurality of logical rows; and a fifth logical column intersecting the second plurality of logical rows to define a fifth plurality of logical cells, wherein each of the fifth plurality of logical cells comprises the received secured version of the plurality of phrases.

In one embodiment, a method, comprising the steps of: receiving data at an electronic computing device, the data comprising a plurality of phrases; transforming each of the plurality of phrases according to a predetermined algorithm to generate a masked version of each of the plurality of phrases; transmitting the masked version of each of the plurality of phrases to a third party system for securing the masked version of each of the plurality of phrases; receiving, at the electronic computing device, the secured version of the plurality of phrases from the third party system; and transmitting the received secured version of the plurality of phrases to a search management system for generation of a a HiiT representative of the received data based on the received secured version of the plurality of phrases, wherein the HiiT comprises: a first logical table, the first logical table including: a first plurality of logical rows, each of the first plurality of logical rows having a first row identifier to identify each of the first plurality of logical rows, wherein each of the first plurality of logical rows corresponds to a particular received secured version of the plurality of phrases in a second logical table; a first logical column intersecting the first plurality of logical rows to define a first plurality of logical cells, wherein each of the first plurality of logical cells comprises the first row identifier to identify each of the first plurality of logical rows; and a second logical column intersecting the first plurality of logical rows to define a second plurality of logical cells, wherein each of the second plurality of logical cells comprises a second row identifier to identify each of a second plurality of logical rows; and the second logical table including: the second plurality of logical rows, each of the second plurality of logical rows having the second row identifier to identify each of the second plurality of logical rows; a third logical column intersecting the second plurality of logical rows to define a third plurality of logical cells, wherein each of the third plurality of logical cells comprises the second row identifier to identify each of the second plurality of logical rows; a fourth logical column intersecting the second plurality of logical rows to define a fourth plurality of logical cells, wherein each of the fourth plurality of logical cells comprises a third row identifier to identify an adjacent row of the second plurality of logical rows; and a fifth logical column intersecting the second plurality of logical rows to define a fifth plurality of logical cells, wherein each of the fifth plurality of logical cells comprises the received secured version of the plurality of phrases.

In one embodiment, a data storage and retrieval system for a computer memory, comprising means for configuring said memory according to a logical table, the logical table including: a plurality of logical rows, each of the plurality of logical rows having a first row identifier to identify each of the plurality of logical rows, wherein each of the plurality of logical rows corresponds to a particular record of information; a first logical column intersecting the plurality of logical rows to define a first plurality of logical cells, wherein each of the first plurality of logical cells comprises the first row identifier to identify each of the plurality of logical rows; a second logical column intersecting the plurality of logical rows to define a second plurality of logical cells, wherein each of the second plurality of logical cells comprises a second row identifier to identify another row of the plurality of logical rows; and a third logical column intersecting the plurality of logical rows to define a third plurality of logical cells, wherein each of the third plurality of logical cells comprises either a record of information or a hash digest.

In one embodiment, a data storage and retrieval system for a computer memory, comprising means for configuring said memory according to a filter-gradient tree, the filter gradient tree including: a plurality of root nodes, each of the plurality of root nodes comprising a filter gradient corresponding to at least two additional root nodes or at least two of a plurality of leaf nodes, wherein the filter gradient comprises a root node identifier, a set membership filter, and an ordered genealogy of the at least two additional root nodes or the at least two of a plurality of leaf nodes; and the plurality of leaf nodes, wherein each of the plurality of leaf nodes comprises a filter corresponding to a particular record of information.

According to one aspect of the present disclosure, the system, wherein the first row identifier comprises a hash digest. Furthermore, the system, wherein the second row identifier in each of the second plurality of logical cells is encrypted. Moreover, the system, wherein the second row identifier in each of the second plurality of logical cells comprises an encrypted link. Further, the system, wherein the second row identifier in each of the third plurality of logical cells is unencrypted. Additionally, the system, wherein the third row identifier is encrypted. Also, the system, wherein the third row identifier comprises an encrypted link.

According to one aspect of the present disclosure, the system, wherein a particular third row identifier comprises an optionally-encrypted stop symbol. Furthermore, the system, wherein the record of information is encrypted. Moreover, the system, wherein the record of information comprises metadata regarding the record of information. Further, the system, wherein each record of information comprises a particular phrase, word, or document. Additionally, the system, where each record of information is encrypted with a different hash or encryption key. Also, the system, wherein the first logical table comprises a HiiT hash table. Furthermore, the system, wherein the second logical table comprises a HiiT inverted index table.

According to one aspect of the present disclosure, the system, wherein the first row identifier is unencrypted. Moreover, the system, wherein the second row identifier in each of the second plurality of logical cells is encrypted. Further, the system, wherein the second row identifier in a subset of the second plurality of logical cells comprises an encrypted link. Additionally, the system, wherein the second row identifier in a subset of the second plurality of logical cells comprises an encrypted link that identifies an adjacent row of the plurality of logical rows or an optionally-encrypted stop symbol. Also, the system, wherein the record of information is encrypted. Furthermore, the system, wherein the record of information comprises metadata regarding the record of information. Moreover, the system, wherein each record of information comprises a particular phrase, word, or document. Further, the system, where each record of information is encrypted with a different hash or encryption key.

According to one aspect of the present disclosure, the system, wherein the set membership filter corresponding to the at least two additional root nodes or the at least two of a plurality of leaf nodes comprises an online filter. Additionally, the system, wherein the set membership filter corresponding to a particular record of information comprises an online filter. Also, the system, wherein the set membership filter corresponding to the at least two additional root nodes or the at least two of a plurality of leaf nodes comprises an offline filter. Furthermore, the system, wherein the set membership filter corresponding to a particular record of information comprises an offline filter. Moreover, the system, wherein the particular record of information comprises a particular phrase, word, or document. Further, the system, wherein each set membership filter corresponding to a particular record of information and each set membership filter corresponding to the at least two additional root nodes or the at least two of a plurality of leaf nodes is encrypted with a different hash or encryption key.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates a sequence diagram showing an exemplary secure-index generation process, according to one embodiment of the present disclosure.

FIG. 2 illustrates an exemplary FiG schema, according to one embodiment of the present disclosure.

FIG. 3 illustrates an exemplary HiiT schema, according to one embodiment of the present disclosure.

FIG. 4 illustrates an exemplary merged HiiT schema, according to one embodiment of the present disclosure.

FIG. 5 (consisting of FIGS. 5A-5C) illustrates an exemplary alternative FiG schema, according to one embodiment of the present disclosure.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to generation of secure indexes that permit the querying or searching of encrypted data in a cryptographically-secure manner.

Data in certain computing architectures may be difficult if not impossible to search/query against. For example, the data may be in an encrypted/obfuscated format, which limits the efficacy of plaintext searches of the data. In another example, the data may be stored and/or managed in a separate location or system that prevents the use of a traditional search functionality to query the data. According to the present disclosure, in computing architectures where the data is difficult to search/query against, a secure index, such as a filter or a hash and inverted index table ("HiiT") data structure, may be used to represent the data so that a subsequent user, with access to only the filter or HiiT, may determine whether his or her particular search term/query is within that data without querying/searching the data.

Generally, "filters" (also referred to as "set membership filters" and/or "approximate set membership filters") are probabilistic algorithms, data structures, or other mathematical objects that can be used to quickly decide whether a given element is within a given set (e.g., filters solve the set membership problem by efficiently testing whether a large set of data contains a particular item). Thus, filters are created to efficiently represent a large set of data so that a subsequent user can determine, with an acceptable error rate (of false positives, false negatives, and other types of collisions), whether an item is within the original set of data through access to just the filter (further details regarding set membership filters are discussed in Sean A. Weaver et al., *Satisfiability-based Set Membership Filters*, in 8 Journal on Satisfiability, Boolean Modeling and Computation 129 (2014), the disclosure of which is incorporated by reference herein). To accomplish this space-efficient and time-efficient querying, set membership filters generally comprise representations of each of the data elements within the set of data elements the particular filter was constructed to represent. Examples of filters include, but are not limited to, Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, counting quotient filters, word-size truncated recursion filters, SAT filters, XORSAT filters, Bloomier filters, and other types of set membership filters. In various embodiments, filters may be stored in memory and checked before performing a slower retrieval from storage because memory is generally fast but expensive and limited in space, whereas storage is cheap and unlimited in space but slow.

In one embodiment, one or more "dictionaries" may also be employed in conjunction with filters to provide additional data (e.g., metadata, etc.). Generally, dictionaries are algorithms similar to filters that answer the question "what value does a particular item evaluate to in the set?" or "what is the context of a particular item in the set?" in contrast to a filter answering the question "is this item in the set?" (further details regarding dictionaries are discussed in Ely Porat, *An Optimal Bloom Filter Replacement Based on Matrix Solving*, in arXiv:0804.1845 [cs.DS] (2008), the disclosure of which is incorporated by reference herein). For example, a filter may return a "yes" or "no," that an item is within the set, and one or more dictionaries may be used to determine exactly where in the set the item is located (e.g., that it is the fourth word in the set, etc.), other metadata about the item (e.g., that the item occurs five times in the set, or that it is considered to be an important item in the set based on the context in which it appeared, etc.), or to guide the search algorithm (e.g., instruct the algorithm to jump to a specific subtree instead of continuing with the typical search order, etc.).

A HiiT data structure, in various embodiments, comprises a hash table that points to the rows of an inverted index table (e.g., in one embodiment, the entries of an inverted index table are converted into a set of linked lists with fixed sized nodes, wherein the dimensions of the resulting collection are flattened by storing each node as an encrypted row in a table). Generally, each HiiT hash table comprises "row" columns (also referred to as "buckets" or "values") and "link" columns (also referred to as "keys"), wherein the row column comprises hash digests that are used as row identifiers and the link column comprises encrypted links that point to the row identifiers in the inverted index table. Similarly, in various embodiments, each HiiT inverted index table also comprises "row" columns (also referred to as "buckets" or "values") and "link" columns (also referred to as "keys"), as well as columns for encrypted data (e.g., the indexes of the data represented within the HiiT) and related metadata, wherein the row column comprises randomly generated values that function as unique row identifiers, the link column comprises encrypted links that point to the next row in the HiiT inverted index table or a stop symbol, and the encrypted data and metadata columns comprise data stored in encrypted blocks. A HiiT data structure, in various embodiments, is constructed by repeated insertion of search tokens using an algorithm and is fully dynamic (e.g., permitting insertions, deletions, and modification of the data stored/represented within it). In one embodiment, for additional security benefits, the HiiT hash table and HiiT inverted index table may be combined into a single table. Generally, a HiiT data structure is efficiently searchable and, in certain embodiments, is efficiently deployable.

In various embodiments, an electronic computing device receives data (e.g., through input of the data, selection of the data, creation of data, etc.) for which a filter or HiiT is to be generated so that a subsequent user can securely query the received data. This received data may need to be securely queried for many reasons including, but not limited to, the received data will be encrypted (thereby making a plaintext search of the received data ineffective), the received data will be stored in a location that does not permit querying, etc. Examples of data for which filters or HiiTs may be generated include (but are not limited to) text files, audio files, video files, data files, system files, image files, or any form of digital data comprising emails, electronic documents, online messages, social media posts, web-based forms, etc., or any variant, sub-part, portion, or combination thereof. In one embodiment, this data may represent a document containing sensitive data that will be encrypted.

Generally, to generate filters or HiiTs, in one embodiment, the electronic computing device preprocesses the received data by identifying discrete phrases within the received data, removing redundant phrases, removing commonly-used phrases (e.g., "an"), stemming the phrases, adding noise/padding (to intentionally produce false positives and further obfuscate the identity of the underlying data), semantic processing (e.g., named entity recognition, classification, machine learning algorithms, image recognition/detection, scan-screen-remove personally identifiable information, etc.), etc. The electronic computing device transforms the preprocessed data according to a predefined algorithm to mask the data from a third party system so that the third party system (or any other observer such as a nefarious party or the search management system discussed herein) will have no knowledge of the phrases. In one embodiment, the third party system is a system that is operated separate and distinct from the electronic computing device. The electronic computing device transmits the masked phrases to the third party system, in one embodiment, wherein the third party system transforms the masked phrases using a predefined cryptographic algorithm and a cryptographic key, which is known only to the third party system, to generate a secured version of the masked phrases and transmits that secured version of the masked phrases back to the electronic computing device. Upon receipt of the secured version of the masked phrases, in one embodiment, the electronic computing device extracts the secured version of the masked phrases using a predefined algorithm (e.g., an oblivious pseudorandom function, etc.). The electronic computing device generates the filter or HiiT based on the extracted secured version of the masked phrases for subsequent secure querying of the received data. In various embodiments, the filter may be stored in a linear data structure (e.g., record, array, etc.) or a nonlinear data structure (e.g., filter-gradient ("FiG") tree, inverted index, multidimensional filter, etc.).

In various embodiments, a filter gradient is a triple comprising a node identifier, a set membership filter, and an ordered genealogy (such that filter gradient comprises a filter that encodes a subset of the items encoded by its parent), and a FiG tree is a rooted tree with filter gradients (and, optionally, one or more dictionaries) as nodes such that each filter gradient uses a different hash. Querying of a FiG tree is generally performed through a depth first search (e.g., pre-order transversal, post-order transversal, reverse post-order transversal, etc.) or a breath first search of the individual filter gradients within the FiG tree. FiG trees can be composed of either offline or online filters, depending on the required properties of the FiG tree. Generally, a FiG tree is efficiently searchable and, in certain embodiments, is efficiently deployable. In one embodiment, one or more dictionaries may be used to define/override the ordered genealogy of a FiG tree.

A FiG tree, in various embodiments, may comprise set membership filters with a much higher false positive rate (e.g., greater than 10%, etc.) and still achieve an overall lower false positive rate for the FiG tree itself (e.g., less than 0.0001%, etc.). Generally, it is impractical to use set membership filters with such a high false positive rate in a linear data structure (due to their inaccuracy), whereas the hierarchal FiG tree may, in one embodiment, take up less storage than a linear list of set membership filters with the same overall false positive rate as the FiG tree. If the data follows a natural language distribution, in various embodiments, arranging the set membership filters in the FiG tree, using hypergraph partitioning algorithms, so that the sibling nodes at each depth contain the same number of items can square root the overall storage as compared to the flat linear list of the same set membership filters (with both structures comprising comparable false positive rates). Accordingly, FiG trees represent an improvement in hierarchical filter data structures—representing optimizations in both storage size and false positive rates.

EXEMPLARY EMBODIMENTS

Referring now to the figures, for the purposes of example and explanation of the fundamental processes and components of the disclosed systems and methods, reference is made to FIG. 1, an exemplary secure-index generation process 100 is shown according to one embodiment of the present disclosure. As will be understood and appreciated, the exemplary secure-index generation process 100 shown in FIG. 1 represents merely one approach or embodiment of the present system, and other aspects are used according to various embodiments of the present system (further details of which are described in U.S. patent application Ser. No. 15/392,561, entitled, "Systems and Methods for Cryptographically-Secure Queries Using Filters Generated by Multiple Parties," and filed on Dec. 28, 2016, the disclosure of which is incorporated by reference herein). As will be understood by one having ordinary skill in the art, the steps and processes shown in FIG. 1 (and those of all other flowcharts and sequence diagrams shown and described herein) may operate concurrently and continuously, are generally asynchronous and independent, and are not necessarily performed in the order shown. Generally, the steps and process shown in FIG. 1 (and those of all other sequence diagrams and flowcharts shown and described herein) may occur automatically without the intervention of a user.

In various embodiments, the secure-index generation process 100 may employ an elliptic curve oblivious pseudorandom function ("EC-OPRF"), based on hashing integers to points on an elliptic curve over a finite field and computing the blinded multiples of each point, to mask, secure, and prepare phrases (e.g., unique terms from a document, data that will later be queried using the disclosed system, etc.) for insertion into the secure indexes (e.g., filters, HiiT, etc.), as follows. As will occur to one having ordinary skill in the art, the use of EC-OPRF enables creation of the filters such that neither an electronic computing device 106 that created the data nor a third party system 112 that assists with the secure-index generation process 100 may independently determine the terms within a filter. In one embodiment, multiple hashes may be used during the secure-index generation process 100 (as part of EC-OPRF) so that it is difficult to use statistical estimates of the number of distinct terms, term frequency, etc. to reduce the security of the generated filter, FiG tree, HiiT, etc.

Generally, the secure-index generation process 100 is the process by which secure indexes (e.g., such as those filters discussed in the description of FIG. 2, those HiiTs discussed in the description of FIG. 3) are created for subsequent querying. In various embodiments, the secure-index generation process 100 begins at step 102 when the electronic computing device 106 receives data from a user as part of generation of that data (e.g., the user creates a document) or from some other system or instruction. In one embodiment, the user may not enter data into the electronic computing device but may instead select data (e.g., existing files, etc.) for which the secure-index generation process will occur as, for example, part of a bulk import. Examples of data include (but are not limited to) text files, audio files, video files, data files, system files, image files, or any form of digital data comprising emails, electronic documents, online messages, social media posts, web-based forms, etc., or any variant, sub-part, portion, or combination thereof. In various embodiments, at step 104, the data may be encrypted or otherwise transformed in such a way that traditional search mechanisms (e.g., plaintext, etc.) will no longer work to query the data (e.g., obfuscation, tokenization, etc.), by the electronic computing device 106 or another system. Generally, this disclosure should be understood to place no restrictions on the method of encryption (e.g., encryption at rest, encryption in motion, format preserving, etc.) or cryptographic algorithm used to perform the same (e.g., AES, RSA, etc.) or whether the data is encrypted at all. After encrypting the data, in one embodiment, the electronic computing device 108 stores the encrypted data in an encrypted data storage system 110 at step 108. Thus, at step 114, in one embodiment, the encrypted data storage system 110 provides the electronic computing device 108 with a file path or other storage location identifier so that the electronic computing device 106 may locate the encrypted data corresponding to the received data at a later date/time. In various embodiments, steps 108 and 114 may not occur at all because the data may not be encrypted.

At step 116, the electronic computing device 106, in one embodiment, may temporarily retain an unencrypted copy of the data and preprocess the data to make querying the data more efficient and effective by generating a list of discrete phrases contained within the data. Generally, the phrases may be, but are not limited to, specific words (e.g., "dog"), combination of letters (e.g., "do"), a combination of words and/or letters, numbers, etc. In one embodiment, the data is processed according to certain predefined rules to make the queries more efficient and secure by flagging as low-priority or removing redundant phrases, flagging as low-priority or removing commonly-used phrases (e.g., "the"), normalizing the data, stemming the data, etc. In one embodiment, the electronic computing device 106 may tag each phrase with contextual information/metadata regarding the phrase (e.g., a column header, a data field, a data identifier, page number, paragraph number, etc.) so that the subsequent queries can be narrowly tailored (e.g., a user may search for "DOG" on page 1, in the first column of a file, as the pet type, etc.). For example, in one non-limiting embodiment, if "DOG" is in the first column of a spreadsheet, then the electronic computing device 106 would tag "DOG" with "column1" to generate the phrase "column1_DOG" at step 116 that will be masked, secured, and extracted before being placed into the filter. Thus, when a subsequent user wishes to query for "DOG" in column 1, the phrase that would form the basis of the query would be "column1_DOG" and could be manually generated by a user with an understanding of the tagging nomenclature or automatically generated by the electronic computing device 106 based upon the inputs of the user (further details of the cryptographically-secure query process will be discussed in association with the description of FIG. 4).

In one embodiment, at step 120, the electronic computing device 106 masks each of the discrete phrases using an algorithm so that the third party system 112 cannot determine the original phrases. For example, at step 120, the electronic computing device 106 hashes each of the preprocessed phrases (e.g., t) along a non-singular elliptic curve (e.g., with agreed upon elliptic curve domain parameters $E(F_q)$ and order r) using an NIST-approved hash function, wherein each phrase is mapped to a point (e.g., $P_t \in E(F_q)$) along the curve (further details of which are discussed in, for example, Thomas Icart, *How to Hash into Elliptic Curves*, in 5677 Lecture Notes in Computer Science (Advances in Cryptology—CRYPTO 2009) 303 (2009), the disclosure of which is incorporated by reference herein), and then "masks" the phrases by computing the scalar multiplication of a random integer or private encryption key (e.g., $m_A$) with the hashed phrases. As will occur to one having ordinary skill in the art, this disclosure places no limitations on the type of elliptic curve that me deployed as part of the exemplary secure-index generation process 100. Generally, the selected elliptic curve may vary in both type (e.g., twisted, super-sigular, etc.), parameters (e.g., NIST P-256, NIST P-384, Curve25519, brainpoolP256t1, etc.), implementation without, etc.

In various embodiments, at step 122, the electronic computing device 106 transmits the masked phrases (e.g., $m_A*P_t \in E(F_q)$) to the third party system 112 for further processing. At step 124, in one embodiment, the third party system 112 receives and secures the masked phrases by computing the scalar multiplication of each of the hashed phrases with a random integer or private encryption key (e.g., $k_T$) that is only known to the third party system. At step 126, in various embodiments, the third party system 112 transmits the secured versions of the phrases (e.g., $k_T*(m_A*P_t)$) back to the electronic computing device 106. In various embodiments, at step 128, the electronic computing device 106 receives and extracts the secured phrases by multiplying the secured query term by the multiplicative inverse of the computations used to mask the query term (e.g., $m_A^{-1}$ (modr)), which generates a pseudorandom function based on the elliptic curve and the extracted secured phrases (e.g., $k_T^* P_t$ that is equal to $m_A^{-1} * ((k_T \cdot m_A) * P_t))$ to ensure that neither the electronic computing device 106 nor the third party system 112 may independently determine the discrete phrases.

In another non-limiting example, the step 120, 124, and 128 (e.g., masking, securing, and extracting the phrases) may be conducted in an "additive" method instead of the aforementioned "multiplicative" method, where the Elliptic Curve Discrete Log Problem (ECDLP) still applies. Continuing with this example, in one embodiment, the masked phrases (e.g., $m_A B + P_t \in E(F_q)$) are generated by the electronic computing device 106 at step 120, wherein B corresponds to a public basepoint, and steps 124 and 128 are updated to match.

In various embodiments, at step 130, the electronic computing device 106 generates one or more filters or the HiiT based on the extracted secured phrases. At step 132, in one embodiment, the electronic computing device 106 transmits the filters or HiiT to a search management system 118, where the filters or HiiT are stored for use in subsequent secure querying of the data. In one embodiment, the search management system 118, using an encryption key (e.g., $k_C$), further encrypts the filters (e.g., by generating $(k_T \cdot k_C) * P_t$) to ensure that no party (e.g., malicious actor, electronic computing device 106, third party system 112, etc.) can determine the information contained within the same (or any information shared or similar between the items within the filters).

In one embodiment, any trusted party (e.g., the electronic computing device 106, third party system 112, or search management system 118) may initiate a key rotation, whereby the private keys of each of the electronic computing device 106, third party system 112, and search management system 118 are updated so that any parties eavesdropping on the secure-index generation process 100 or the cryptographically-secure query process of those secure-filters cannot replay previous transmissions, distinguish the updated transmissions (constructed with the updated keys) from previous transmissions (constructed with the prior keys), or decrease the difficulty of inverting the updated transmissions. Generally, in various embodiments, the trusted party initiating the key rotation generates $k_R \in Z$ relatively prime to r and calculates $k_R^{-1}$(modr). The values of $k_R$ and $k_R^{-1}$ are distributed to the third party system 112 and search management system 118 so that each party may update its respective private key (e.g., $k_{Tnew} = k_T \cdot k_R$, $k_{Cnew} = k_T \cdot k_R^{-1}$, etc.).

Now referring to FIG. 2, an exemplary FiG tree 200 is shown, according to one embodiment of the present disclosure, displaying exemplary filters 202 and 204 stored at each node 206 and 208 of the FiG tree 200. In one embodiment, a filter gradient is a triple comprising a node identifier, a set membership filter, and an ordered genealogy (such that filter gradient comprises a filter that encodes a subset of the items encoded by its parent), and a FiG tree is a rooted tree with filter gradients (and, optionally, one or more dictionaries) as nodes. In various embodiments, the FiG tree 200 comprises a storage schema (e.g., secure index) for filters in the form of a tree of keyed set membership filters, wherein each node 206 and 208 of the FiG tree 200 comprises a unique filter 202 and 204, wherein each unique filter (e.g., 204a, 204b, 202a, 202b, etc.) is separately keyed such that access to one filter 202 or 204 does not provide any information regarding the other filters in the FiG tree 200. The FiG tree 200 is generally constructed such that querying a particular node 206a for a particular query term (e.g., "CAT") will indicate whether a particular node 206b or 206c underneath it in the FiG tree 200 comprises that term (e.g., depth first searching/pre-order transversal, etc.). For example, if searching for the term "CAT" in the FiG tree 200, a query of the node 206a would indicate that at least one node 206b or 206c beneath it may comprise the search term. Continuing with this example, the search would continue with a query of both nodes 206b and 206c, which would indicate that only the nodes/leaves 208 beneath node 206b may comprise the search term. Thus, the search would continue until leaf 208a is determined to be the only leaf 208 that may comprise the search term "CAT." In an alternate embodiment, every particular query term has a unique navigation through the FiG tree 200 (e.g., the order in which the particular nodes 206 are queried) because the tranversal order is partially determined by the query itself. Generally, Boolean operations (e.g., "CAT" and "DOG") may be synchronized at any depth level of the FiG tree 200 (see further discussion in the description of FIG. 5).

Generally, the FiG tree 200 requires relatively small amounts of storage (in comparison to a standard table) by requiring smaller filters to result in the same rate of false positives (alternatively, FiG tree 200 may reduce the rate of false positives through use of multiple filters of the same size as those in a standard filter table, but the size of the FiG tree 200 would likely be larger than that of a standard filter table) and promotes faster querying because the queries are probabilistic and terminate sublinearly when not every node 206 and 208 of the FiG tree 200 needs to be searched for a query term (e.g., as discussed in the previous example, wherein only five of the seven nodes 206 and 208 are searched to find the search term "CAT"). In various embodiments, the FiG tree 200 supports Boolean searches and other more complicated searches, while being filter agnostic (e.g., compatible with any type of filter). In one embodiment, the filters within the FiG tree 200 can be arranged (e.g., using a hypergraph partitioning algorithm) such that the FiG tree 200 is substantially compressed (e.g., gigabytes of data become megabytes of data) as compared to a standard filter table for the same data, so long as every term in every document is not unique.

In various embodiments, the FiG tree 200 is constructed by a device that has access to the plaintext of the documents that are stored within the search management system 118 (e.g., when the FiG tree 200 comprises a filter-gradient tree). For example, in one embodiment, the FiG tree 200 may be constructed by the electronic computing device 106 (from FIG. 1) of the creator 102 who created the document. In an alternative embodiment, the FiG tree 200 is constructed by the encrypted data storage system 110 (from FIG. 1) or the search management system 118. In another embodiment, the FiG tree 200 is created by another entity that is not any of the electronic computing device 106, encrypted data storage system 110, or the search management system 118. In various embodiments, the FiG tree 200 comprises one or more FiG filters 204 that are specifically constructed to indicate the content of the nodes 206 and leaves 208 beneath that particular FiG filter 204. Generally, at the bottom of the tree are the leaves 208 that comprise the filters 202 that are constructed in accordance with the present disclosure to securely represent a particular item of data 104 (as discussed in association with the description of FIG. 1) or a portion/subset of the same (also referred to herein as a "record of information"). For example, a particular leaf 208a may represent a single document (e.g., "Doc2") or one or more leaves 208b may represent a single document (e.g., "Doc1").

In one embodiment, the FiG tree 200 may be padded with random entries (e.g., by inserting filters that do not represent any actual data into empty nodes 204 or leaves 208) such that it contains the maximum number of items at each depth of the tree (e.g., no node 204 is missing any leaves 208) thereby obscuring the true size of the FiG tree 200. In one embodiment, the FiG tree 200 may not contain the maximum number of items at each depth of the tree. In one embodiment, the FiG tree 200 may be configured to provide all query results after a fixed period of time to confound timing attacks (e.g., determining the rank of query results based on the time it takes the FiG tree 200 to return the results). In one embodiment, the FiG tree 200 may comprise filters that store trigger values that alert the search management system 118 when a particular blacklisted term has been queried. In one embodiment, the FiG tree 200 may comprise values that generally indicate a particular query is forbidden.

Generally, the FiG tree 200 may comprise either offline or online filters. Online filters generally comprise set membership filters that generally permit additional dynamic functionality such as inserting data elements after initial creation of the filter, deleting data elements after initial creation of the filter, counting of the data elements stored within the filter, etc. Examples of online filters include Bloom filters, compressed Bloom filters, blocked Bloom filters, counting Bloom filters, spectral Bloom filters, buffered quotient filters, cascade filters, Cuckoo filters, approximate concurrent state machines, rank-index hashing, key-value Bloom filters, stable Bloom filters, counting quotient filters, etc. Offline filters, in contrast, generally comprise set membership filters that generally do not permit additional dynamic functionality (e.g., inserting or deleting data elements after initial creation of the filter, etc.) and instead only permit querying to determine whether a data element is represented with the filter as originally constructed. Examples of offline filters include matrix-solving based dictionaries, succinct dictionaries, word-size truncated recursion filters, SAT filters, XORSAT filters, Bloomier filters, etc. In various embodiments, if the FiG tree 200 comprises offline filters, it should be constructed in its entirety once all of the filters have been accumulated, as it generally cannot be modified after construction. In contrast, if the FiG tree 200 comprises online filters, it can be constructed incrementally over time, as it permits insertion, deletion, and other forms of modification. Generally, two or more FiG trees 200 may be constructed in parallel and merged together to form a single FiG tree 200, if their roots 206 allow inserts and agree on filter parameters (e.g., memory size, type, has indexes, etc.). In one embodiment, the FiG tree 200 may comprise both offline and online filters to provide robust functionality, but, in that embodiment, only those roots 206 and leaves 208 that are constructed entirely of online filters may be dynamically updated (e.g., permitting insertions, deletions, etc.).

Generally, the size of the FiG tree 200 is dependent on the amount of data that it represents, its false positive rate, and its efficiency. In various embodiments, the FiG tree 200 requires less storage space that a HiiT with for similar amounts of data, false positive rates, and efficiencies. In one embodiment, the filters 204 that form the roots 206 of the FiG tree 200 may be compressed to reduce the size of the FiG tree 200, as, in certain embodiments, these filters 204 may be long and mostly empty. Similarly, in one embodiment, a star-configuration of the FiG tree 200 (not shown in FIG. 2), wherein all FIG. leaves 208 are the direct descendants of the roots 206 of the FiG tree 200 minimizes the storage requirements for the FiG tree 200 but maximizes the search runtime, as fewer filters overall are required but there are more leaves 208 in the FiG tree 200 (e.g., as shown in FIG. 2, nodes 206*b* and 206*c* would be removed from the FiG tree 200 to generate a star configuration, which would only have five filters, instead of seven, but would require searching all of the filters to find a particular term).

In one embodiment, the FiG tree 200 may comprise a segment tree to support range queries. Generally, if the leaves 208 comprise online filters, then the results of a range query could be a filter that comprises the items from one or more nodes 206 that can be further searched.

In various embodiments, the order of query results (e.g., the "rank" of the results) may be modified by rearranging the leaves 208. For example, as shown in FIG. 2, a query for the term "DOG" would yield the result from filter 202*b* before the result from filter 202*c*. If, however, in one embodiment, the positions of filters 202*b* and 202*c* were switched, then the result from filter 202*c* would be shown before the result from filter 202*b*.

Referring now to FIG. 3, an exemplary HiiT 300 is shown according to one embodiment of the present disclosure. The HiiT 300 generally enables faster non-Boolean querying than the FiG tree 200 (generally, the FiG tree 200 will be faster than the HiiT 300 for most Boolean searches). In various embodiments, the HiiT 300 generally comprises a hash table 302 that points to the rows 304 of an inverted index table 306 (e.g., in one embodiment, the entries of an inverted index table are converted into a set of linked lists with fixed sized nodes, wherein the dimensions of the resulting collection are flattened by storing each node as an encrypted row 304 in a HiiT inverted index table 306).

Generally, each HiiT hash table 302 comprises row columns 308 and link columns 310, wherein the row column 308 comprises hash digests 312 that are used as row identifiers for the HiiT hash table 302 and the link column 310 comprises encrypted links 314 that point to the row identifiers 316 in the HiiT inverted index table 306. In one embodiment, an encrypted data encryption key is also stored in the row column 308 with the hash digest 312 (or in a separate row linked to the hash row), wherein the encrypted key helps facilitate re-encryption of the HiiT 300 (and the key encryption key is stored in a separate location from the HiiT 300) by permitting decryption of the term key/data encryption key that permits access to the result(s) stored in the HiiT 300. Similarly, in various embodiments, each HiiT inverted index table 306 also comprises row columns 318 and link columns 320 as well as columns 322 for encrypted data (e.g., the indexes of the data represented within the HiiT) and related metadata (e.g., whether the term is a fake term/result, whether a term in another row is a fake term/result, additional data to assist with re-indexing, etc.), wherein the row column 318 comprises randomly generated values that function as the unique row identifiers 316 for the HiiT inverted index table 306, the link column 320 comprises encrypted links 324 that point to the next row in the HiiT inverted index table 306 or a stop symbol (e.g., an encrypted stop symbol, the row identifier 316 of the primary/first row of the HiiT inverted index table 306, etc.), and the encrypted data and metadata columns 322 comprise data stored in encrypted blocks 326 (securely representing a particular item of data 104, as discussed in association with the description of FIG. 1, or a portion/subset of the same, which is also referred to herein as a "record of information"). In one embodiment, the HiiT 300 comprises a single table comprising both the HiiT hash table 302 and the HiiT inverted index table 306 (further discussion of which is provided in association with the description of FIG. 4). Alternatively, in one embodiment, metadata regarding whether a particular term/result is fake may be stored external to the HiiT 300 for security purposes; similarly, in one embodiment, if that metadata is stored within the HiiT 300, it may be stored in a manner that cannot be accessed by the HiiT 300.

The HiiT 300, in various embodiments, is constructed by repeated inserting search tokens using an algorithm and is fully dynamic (e.g., permitting insertions, deletions, and modification of the data stored/represented within it). For example, for a particular extracted, secured phrase (e.g., from step 128 in FIG. 1), the system determines whether the phrase is already in the HiiT hash table 302, if the phrase is not in the HiiT hash table 302, then the system inserts a new row in the HiiT inverted index table 306, generating a unique row identifier 316 to correspond to the row for the phrase. In one embodiment, the system then encrypts the generated unique row identifier 316 to generate the encrypted link 314 and inserts the generated encrypted link 314 into HiiT hash table 302. If the phrase is already in the HiiT hash table 302, then, in one embodiment, the corresponding encrypted link 314 is decrypted using an encryption key associated with the HiiT inverted index table 306 to generate the corresponding row identifier 316 in the HiiT inverted index table 306. The encrypted link 324 corresponding to the row identifier 316 is generally decrypted to determine if any additional results are stored within the HiiT inverted index table 306. In various embodiments, the system may decide (e.g., due to performance tuning for insertion time, to implement a ranking scheme, etc.) to insert the new element at the start of the list, anywhere within the list, or at the end of the list. In one non-limiting example of inserting the item at the end of the list, the system will continue to iterate, decrypting the corresponding encrypted link 324 for the row until it locates a row where the decrypted version of the encrypted link 324 indicates that no further rows exist. Continuing with this example, the insertion algorithm will update the encrypted link 324 to point to an additional row in the inverted index table 306 which the insertion algorithm has created to represent the new entry. Alternatively, to insert the new element at the start of the list or at any point in the middle of the list, the system will locate the appropriate insertion row (either by finding the first row or iterating until the appropriate row is selected), then the system will insert the row and update the appropriate encrypted links 324 to ensure that the encrypted links 324 still point to the appropriate rows. In one embodiment, the HiiT 300 may represent a single document or multiple documents.

Generally, the data 326 within the HiiT inverted index table 306 may be stored in encrypted format to provide additional security (e.g., requiring data provided by a searcher to further decrypt the results). Similarly, in one embodiment, multiple hashes may be used to construct the HiiT 300 so that it is difficult to use statistical estimates of the number of distinct terms, term frequency, etc. to reduce the security of the HiiT 300. Further, in various embodiments, the unique row identifiers 312 and 316 may be randomly generated to increase the security of the HiiT 300 by hiding the order in which the rows 304 were generated, as long as the row identifiers 312 and 316 are of sufficient size to provide for unique values of all of the potential terms to be stored in the HiiT 300 (e.g., because once a row identifier is generated, an encrypted link 314 or 324 to that row identifier gets stored elsewhere in the HiiT 300).

Generally, the HiiT 300 may be constructed in parallel (e.g., as part of a bulk encryption of data) as long as the row identifiers 312 and 316 are generated in a manner that ensures uniqueness of the same. In one embodiment, two HiiTs 300 can be merged into a single HiiT 300 by concatenating the encrypted links 314 for the mutual values stored in the HiiT hash tables 302. In one embodiment, the HiiT hash table 302 and HiiT inverted index table 306 of the HiiT 300 can be merged into a single table by inserting the row column 308 into the encrypted data and metadata column 322 and the link column 310 into the link column 320, alongside newly generated row identifiers 316 for each row in the former HiiT hash table 302.

To search for a particular term (e.g., "CAT"), the query term is hashed using an encryption key or a cryptographic hash algorithm (e.g., SHA-256, MD5, etc.) associated with the HiiT hash table 302. Generally, the hashed version of the query term is compared to the row identifiers 312, and if a match is found, then the corresponding encrypted link 314 is decrypted using an encryption key associated with the HiiT inverted index table 306 to generate the corresponding row identifier 316 in the HiiT inverted index table 306. The encrypted link 324 corresponding to the row identifier 316 is decrypted to determine if any additional results are stored within the HiiT inverted index table 306. Generally, the encrypted link 324 may link to a different row 304 in the HiiT inverted index table 306 or embed a search data structure or functional command (e.g., search tree, skip list, search tries, stop, trigger, merge, split, count, update, etc.). The result of the query generally comprises the encrypted block 326 corresponding to the row identifier 316 and any other relevant linked rows 304 in the HiiT inverted index table 306.

The HiiT 300 generally enables sophisticated exact phrase and distance searches by storing search term positional indexes in the data column 322. Further, in one embodiment, Boolean searches can also be simulated in the HiiT 300 by cross-referencing several lists of query results.

Now referring to FIG. 4, an exemplary merged HiiT 400 is shown according to one embodiment of the present disclosure. Generally, the merged HiiT 400 comprises two or more HiiTs 300N and 300M. Generally, the exemplary merged HiiT 400 represents the bulk insertion of data from two or more HiiTs 300N and 300M that does not require the use of encryption keys or the iterative row-by-row insertions discussed in association with the description of FIG. 3.

In various embodiments, HiiTs 300N and 300M comprise a HiiT 300 (from FIG. 3), wherein the HiiT hash table 302 and HiiT inverted index table 306 of the HiiT 300 have been merged into a single table such that the row column comprises row identifiers (e.g., row identifiers 316 from FIG. 3), the link column comprises links to other rows (e.g., encrypted links 324 from FIG. 3), and the data column comprises hashes of terms (e.g., data stored in encrypted blocks 326 from FIG. 3). The data in the link column of HiiTs 300N and 300M, in various embodiments, refers to the row column of the subsequent row, except for the link column of the final row that refers to row column of the first row of HiiTs 300N and 300M. In one embodiment, the link column comprises an encrypted link for the subsequent (or first) row. For example, $l_i=Enc_{key}(r_{i+1})$, $l_n=Enc_{key}(r_1)$, $L_i=Enc_{key}(R_{i+1})$, and $L_m=Enc_{key}(R_1)$. Generally, HiiTs 300N and 300M may be merged by swapping the row identifiers of the first rows of HiiTs 300N and 300M and, subsequently, merging the two tables together.

Referring now to FIG. 5 (consisting of FIGS. 5A-5C), an exemplary alternative FiG schema 500 is shown according to one embodiment of the present disclosure, wherein the exemplary alternative FiG schema 500 comprises row permutations. Generally, exemplary alternative FiG schema 500A shows the transversal order for the term "green,"

exemplary alternative FiG schema 500B shows the transversal order for the term "red," and exemplary alternative FiG schema 500C shows the transversal order for the terms "green" and "red" (a Boolean search). In various embodiments, the exemplary alternative FiG schema 500 confounds patterns in tree transversal, thereby confounding intersection attacks (because terms have different parent nodes), and evenly fills the FiG tree without the need for padding to improve security (thereby decreasing the size of the FiG tree). That said, in various embodiments, the exemplary alternative FiG schema 500 may run slower than a non-permuted FiG tree and, generally, must be entirely initialized upon construction (instead of adding leaves/branches as more documents are inserted).

In various embodiments, the row permutations of the exemplary alternative FiG schema 500 may be generated as follows (with inputs: "term", list L=[0, 2, ..., N−1]; and output: permuted list based on "term"):

1. Let R(m) be a pseudorandom number generator that generates a random number from 0 to m, and deterministically seed R using "term".
2. For i from N−1 down to 1 do: j←R(i) such that 0≤j≤i and exchange L[j] and L[i].
3. Return L.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments.

Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

What is claimed is:

1. A method, comprising the steps of:
receiving, via at least one computing device, data comprising a plurality of phrases;
generating, via the at least one computing device, a plurality of secured versions of the plurality of phrases, wherein each of the plurality of secured versions correspond to a respective one of the plurality of phrases; and
generating, via the at least one computing device, a hash and inverted index table ("HiiT") representative of the data received by:
generating a first plurality of logical rows for a first logical table, each of the first plurality of logical rows having a respective row identifier for identification in a first column and a respective one of the plurality of secured versions in a second column, wherein the respective row identifier for each of the first plurality of logical rows comprises a randomly generated value or hash digest to hide a generation order of the first plurality of logical rows; and
generating a second plurality of logical rows for a second logical table having a respective second row identifier, wherein each of the second plurality of logical rows comprises a link to a row of the first plurality of logical rows in the first logical table.

2. The method of claim 1, wherein the first logical table comprises a link column storing a respective encrypted link to another row in the first logical table.

3. The method of claim 2, wherein at least one of the first plurality of logical rows comprises a stop symbol in the link column.

4. The method of claim 2, wherein the second logical table comprises a column storing a respective one of a plurality of encrypted data encryption keys in each of the second plurality logical rows.

5. The method of claim 1, further comprising:
generating, via the at least one computing device, a plurality of hash digests individually corresponding to a respective one of the plurality of second logical rows; and
storing, via the at least one computing device, individual ones of the plurality of hash digests in a corresponding row of the second plurality of logical rows.

6. The method of claim 1, further comprising:
generating, via the at least one computing device, at least one fake result; and
storing, via the at least one computing device, a secured version of the at least one fake result as a row in the first plurality of logical rows.

7. A system, comprising:
a data store; and
at least one computing device in communication with the data store, the at least one computing device being configured to:
receive data comprising a plurality of phrases;
generate a plurality of secured versions of the plurality of phrases, wherein each of the plurality of secured versions corresponds to a respective one of the plurality of phrases; and
generate a HiiT representative of the data received by:
generating a first plurality of logical rows for a first logical table, each of the first plurality of logical rows having a respective row identifier for identification in a first column and a respective one of the plurality of secured versions in a second column, wherein the respective row identifier for each of the first plurality of logical rows comprises a randomly generated value or hash digest to hide a generation order of the first plurality of logical rows; and
generating a second plurality of logical rows for a second logical table having a respective row identifier that is indistinguishable from random data, wherein each of the second plurality of logical rows comprises a link to a row of the first plurality of logical rows in the first logical table.

8. The system of claim 7, wherein the at least one computing device is further configured to store the HiiT representative of the data in the data store.

9. The system of claim 7, wherein the at least one computing device is further configured to preprocess the received data by adding noise to the plurality of phrases to obfuscate identification of the received data.

10. The system of claim 7, wherein the at least one computing device is further configured to preprocess the received data by:
identifying a plurality of discrete phrases within the data; and
removing commonly-used phrases from the data.

11. A method, comprising:
receiving, via at least one computing device, data comprising a plurality of phrases;
generating, via the at least one computing device, a plurality of secured versions of the plurality of phrases, wherein each of the plurality of secured versions corresponds to a respective one of the plurality of phrases; and
generating, via the at least one computing device, a filter-gradient (FiG) tree representative of the data received by:
  generating a plurality of leaves, where individual ones of the plurality of leaves comprises to a respective one of the plurality of secured versions; and
  generating a plurality of nodes individually comprising one of a plurality of filter gradients, each of the plurality of filter gradients encoding a respective subset of the plurality of leaves.

12. The method of claim 11, further comprising obscuring a size of the FiG tree by padding at least one of: the plurality of leaves and the plurality of nodes with at least one padded leaf or node that does not represent any of the plurality of phrases.

13. The method of claim 12, wherein obscuring the size of the FiG tree comprises generating at least one of the plurality of nodes as an empty node.

14. The method of claim 12, wherein obscuring the size of the FiG tree comprises inserting the at least one padded leaf to cause the FiG tree to contain a maximum number of items at each depth of the FiG tree.

15. The method of claim 11, wherein each of the plurality of nodes comprises a node identifier, a set membership filter, and an ordered genealogy.

16. The method of claim 11, wherein the FiG tree is configured to provide all query results in a fixed period of time.

17. The method of claim 11, wherein generating the FiG tree further comprises generating a second plurality of nodes individually comprising one of a second plurality of filter gradients, each of the second plurality of filter gradients encoding a respective subject of the plurality of nodes.

18. The method of claim 11, further comprising:
generating, via the at least one computing device, a plurality of cryptographic keys; and
securing, via the at least one computing device, individual ones of the plurality of filter gradients with a different respective one of the plurality of cryptographic keys.

19. The method of claim 11, further comprising querying a particular node of the plurality of nodes for a term by determining whether a particular filter gradient of the particular node comprises a leaf in the respective subset of the plurality of leaves that corresponds to the term.

* * * * *